(12) United States Patent
Wu et al.

(10) Patent No.: US 10,227,863 B2
(45) Date of Patent: **\*Mar. 12, 2019**

(54) WELL RANGING APPARATUS, METHODS, AND SYSTEMS

(71) Applicant: Halliburton Energy Services, Inc., Houston, TX (US)

(72) Inventors: Hsu-Hsiang Wu, Sugar Land, TX (US); Yijing Fan, Singapore (SG); Akram Ahmadi Kalateh Ahmad, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/872,487

(22) Filed: Jan. 16, 2018

(65) Prior Publication Data
US 2018/0156028 A1  Jun. 7, 2018

Related U.S. Application Data

(63) Continuation of application No. 14/712,303, filed on May 14, 2015, now Pat. No. 9,903,195.
(Continued)

(51) Int. Cl.
*E21B 47/022* (2012.01)
*E21B 33/13* (2006.01)
(Continued)

(52) U.S. Cl.
CPC ........ *E21B 47/02216* (2013.01); *E21B 33/13* (2013.01); *G01V 3/30* (2013.01); *G01V 3/34* (2013.01)

(58) Field of Classification Search
CPC .......... G01V 3/30; G01V 3/28; E21B 47/011; E21B 47/01; H01Q 1/04
See application file for complete search history.

(56) References Cited

U.S. PATENT DOCUMENTS

| 4,693,313 A | 9/1987 | Stephenson et al. |
| 4,791,373 A | 12/1988 | Kuckes |

(Continued)

FOREIGN PATENT DOCUMENTS

| WO | 2014089402 A2 | 6/2014 |
| WO | 2016022190 A1 | 2/2016 |

OTHER PUBLICATIONS

Canadian Application Serial No. 2,954,366, Office Action dated Nov. 1, 2017, 3 pages.
(Continued)

*Primary Examiner* — Jermele M Hollington
*Assistant Examiner* — Suresh K Rajaputra
(74) *Attorney, Agent, or Firm* — Gilliam IP PLLC

(57) ABSTRACT

A method includes cementing a target well with a target well cement comprising resistive cement having resistivity that is greater than a resistivity of a subsurface formation through which the target well passes. The method includes injecting an injected signal into a conductive casing material at least partially surrounded by the target well cement. The method also includes receiving a resulting signal that results from the injecting at a signal receiver disposed within at least one of the target well and a drilling well separated from the target well.

19 Claims, 15 Drawing Sheets

Related U.S. Application Data

(60) Provisional application No. 62/035,076, filed on Aug. 8, 2014.

(51) Int. Cl.
    *G01V 3/30*     (2006.01)
    *G01V 3/34*     (2006.01)

(56) References Cited

U.S. PATENT DOCUMENTS

| | | |
|---|---|---|
| 4,793,409 A | 12/1988 | Bridges et al. |
| 5,218,301 A | 6/1993 | Kuckes |
| 2006/0255809 A1* | 11/2006 | Johnstad .................. G01V 3/30 324/337 |
| 2007/0278008 A1 | 12/2007 | Kuckes et al. |
| 2008/0041626 A1 | 2/2008 | Clark |
| 2016/0041294 A1* | 2/2016 | Wu .......................... E21B 33/13 324/338 |

OTHER PUBLICATIONS

GCC Examination Report 1; Application No. GC 2015-29624; dated Nov. 14, 2017, 4 pages.
"International Application Serial No. PCT/US2015/030892, International Search Report dated Aug. 21, 2015", 3 pages.
"International Application Serial No. PCT/US2015/030892, Written Opinion dated Aug. 21, 2015", 11 pages.

\* cited by examiner

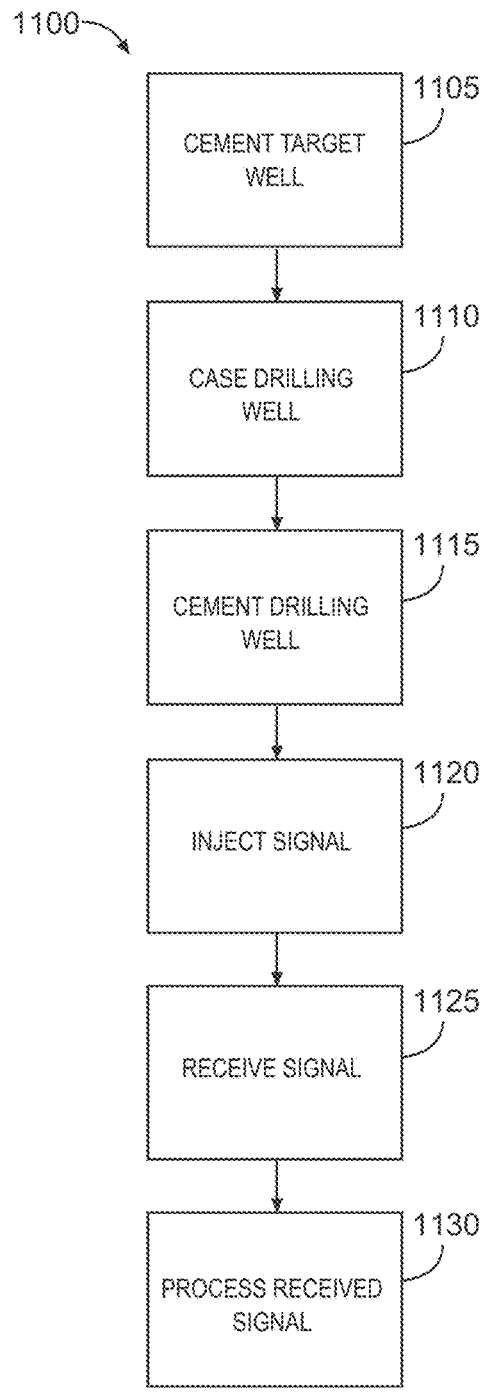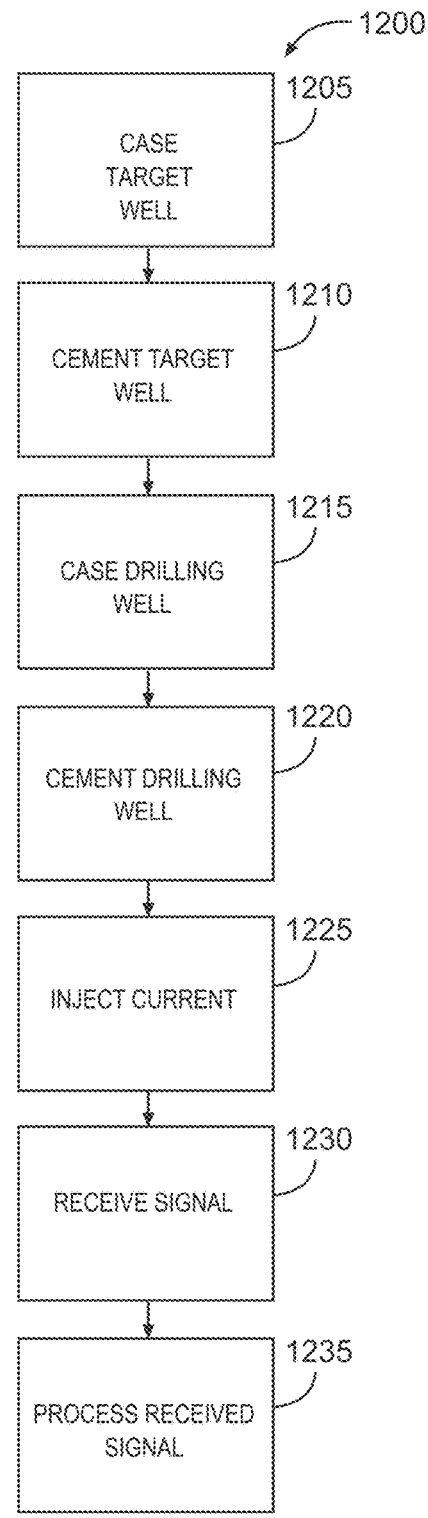
Fig. 11
Fig. 12

WELL RANGING APPARATUS, METHODS, AND SYSTEMS

BACKGROUND

The present disclosure relates generally to methods and apparatus that are used as part of ranging techniques, to determine distance and direction between wells in geological formations.

With much of the world's easily obtainable oil having already been produced, new techniques are being developed to extract less accessible hydrocarbons. These techniques often involve drilling a borehole in close proximity to one or more existing wells. Examples of directed drilling near an existing well include well intersection for blowout control, multiple wells drilled from an offshore platform, and closely spaced wells for geothermal energy recovery. Another such technique is steam-assisted gravity drainage (SAGD) that uses a pair of vertically-spaced, horizontal wells constructed along a substantially parallel path, often less than ten meters apart. Careful control of the spacing contributes to the effectiveness of the SAGD technique.

One way to construct a borehole in close proximity to an existing well is "active ranging" in which an electromagnetic source is located in the existing well and monitored via sensors on the drill string in the well under construction. Another technique involves systems that locate both the source and the sensor(s) on the drill string—these are sometimes called "passive ranging" systems by those of ordinary skill in the art. Such ranging techniques are sometimes limited in the degree of accuracy that can be obtained.

BRIEF DESCRIPTION OF THE DRAWINGS

FIG. 11 is a flow diagram of methods, according to various embodiments.

FIG. 12 is a flow diagram of additional methods, according to various embodiments.

DETAILED DESCRIPTION

Magnetic ranging has been widely used for various applications, including well intersection, well avoidance, SAGD, and others. One excitation method for magnetic ranging is surface excitation. Surface excitation is a popular method of generating a ranging signal. It is relatively easy to implement, without the need for complex cable and equipment. When surface excitation is used, a current is injected into the target well casing at the surface of the well (e.g., at the well head). The current travels along the casing down hole and generates a magnetic field down hole that can be measured at a distance (e.g., in a drilling well) for ranging purposes. As a result, the excitation signal down hole may be very small when the distance beneath the surface is great, due to the current leakage into the conductive formation. Consequently, sensor noise often affects magnetic ranging accuracy at greater depths, leading to false signal measurements and failures in well location. The various embodiments described herein aim to improve down hole current strength and enhance the signal/noise ratio, for improved accuracy with respect to ranging measurement technology.

Thus, novel methods are proposed to reduce or block the leakage current into a relatively conductive formation. By taking this approach, the magnitude of down hole ranging current at the point of measurement can be increased, sometimes by as much as ten times or more. In most situations, the improvement results in doubling the signal magnitude. Therefore, the apparatus, methods, and systems proposed herein can be used to reduce measurement issues that arise due to noise, as well as to generate larger signals at great depths. This means that the maximum detection ranges for existing ranging systems can also be significantly improved. In some embodiments, the apparatus, methods, and systems described herein can be applied to electromagnetic (EM) telemetry applications.

Figure 1:
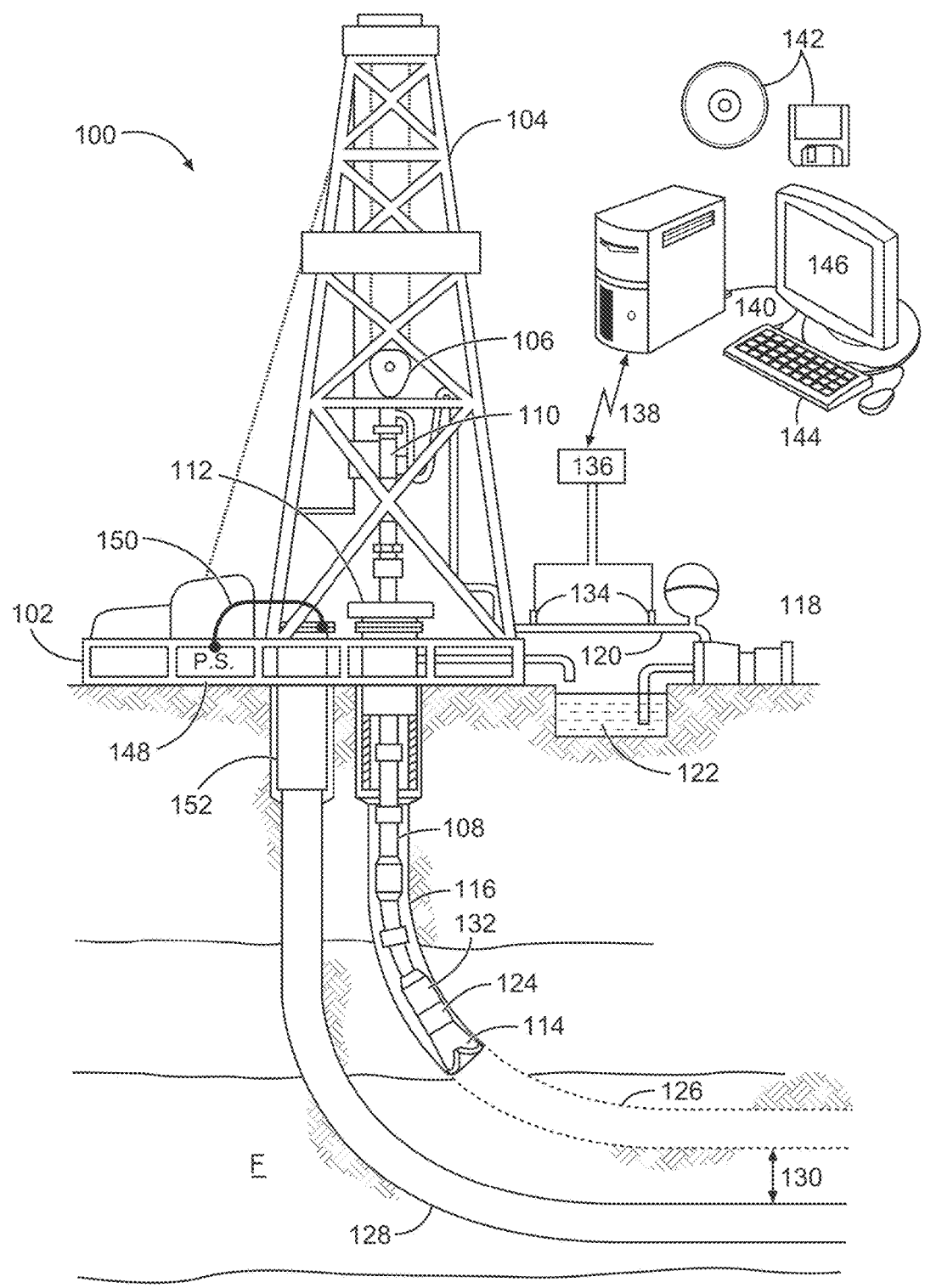
FIG. 1 depicts an example drilling environment in which ranging embodiments may be employed.

The disclosed apparatus (e.g., logging tools), systems, and methods are best understood in the context of the larger systems in which they operate. Accordingly, FIG. 1 depicts an example drilling environment 100 in which ranging embodiments may be employed.

That is, this figure illustrates an example drilling environment 100 in which a drilling platform 102 supports a derrick 104 having a traveling block 106 for raising and lowering a drill string 108. A top drive 110 supports and rotates the drill string 108 as it is lowered through the well-head 112. A drill bit 114 is driven by a downhole motor and/or rotation of the drill string 108. As the drill bit 114 rotates, it creates a borehole 116 that passes through various formations. A pump 118 circulates drilling fluid through a feed pipe 120 to top drive 110, downhole through the interior of drill string 108, through orifices in drill bit 114, back to the surface via the annulus around drill string 108, and into a retention pit 122. The drilling fluid transports cuttings from the borehole into the retention pit 122 and aids in maintaining the borehole integrity.

The drill bit 114 is just one piece of a bottom-hole assembly that includes one or more drill collars (thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (a.k.a. rotational or azimuthal orientation), an inclination angle (the slope), and a compass direction, each of which can be derived from measurements by magnetometers, inclinometers, and/or accelerometers, though other sensor types such as gyroscopes may also be used. In one specific embodiment, the tool includes a three-axis fluxgate magnetometer and a three-axis accelerometer. As is known in the art, the combination of those two sensor systems enables the measurement of the tool face angle, inclination angle, and compass direction. In some embodiments, the tool face and hole inclination angles are calculated from the accelerometer sensor output. The magnetometer sensor outputs are used to calculate the compass direction.

The bottom-hole assembly further includes a ranging tool 124 to receive signals from current injected by a surface power supply 148 into nearby conductors such as pipes, casing strings, and conductive formations and to collect measurements of the resulting field to determine distance and direction. Using measurements of these signals, in combination with the tool orientation measurements, the driller can, for example, steer the drill bit 114 along a desired path in the drilling well 126 relative to the existing well (e.g., target well) 128 in formation F using any one of various suitable directional drilling systems, including steering vanes, a "bent sub", and a rotary steerable system. For precision steering, the steering vanes may be the most useful steering mechanism. The steering mechanism can be controlled from the Earth's surface, or downhole, with a downhole controller programmed to follow the existing borehole 128 at a predetermined distance 130 and position (e.g., directly above or below the existing borehole).

A telemetry sub 132 coupled to the downhole tools (including ranging tool 124) transmits telemetry data to the surface via mud pulse telemetry. A transmitter in the telemetry sub 132 modulates a resistance to drilling fluid flow to generate pressure pulses that propagate along the fluid stream at the speed of sound to the surface. One or more pressure transducers 134 convert the pressure signal into electrical signal(s) for a signal digitizer 136. Note that other forms of telemetry exist and may be used to communicate signals from downhole to the digitizer. Such telemetry may employ acoustic telemetry, electromagnetic telemetry, or telemetry via wired drill pipe.

The digitizer 136 supplies a digital form of the telemetry signals via a communications link 138 to a computer 140 or some other form of a data processing device. The computer 140 operates in accordance with software (which may be stored on information storage media 142) and user input via an input device 144 to process and decode the received signals. The resulting telemetry data may be further analyzed and processed by the computer 140 to generate a display of useful information on a computer monitor 146 or some other form of a display device. For example, a driller could employ this system to obtain and monitor drilling parameters, formation properties, and the path of the borehole relative to the existing borehole 128 and any detected formation boundaries. A downlink channel can then be used to transmit steering commands from the surface to the bottom-hole assembly.

This figure illustrates a magnetic ranging system with surface excitation. The power supply 148 at the surface thus employs a cable 150 to inject current into target well casing 152 and flowing to down hole so that magnetic fields can be generated surrounding a target well 128. Then sensors in the ranging tool 124 in the drilling well 126 can determine the magnetic fields so that distance and direction between the target well 128 and drilling well 126 can be determined.

The target well is often a cased hole with cement installed around the outside of the casing. In the completion phase of oil and gas wells, the cement serves to isolate the wellbore, prevents casing failure, and keeps the wellbore fluids from contaminating freshwater aquifers.

Cement is usually a fine grey powder made of a mixture of calcites limestone and clay, mixed with water and sand to make mortar, or with water, sand, and aggregate, to make concrete. Due to the water component, cement is not a perfect electrical insulator. In fact it is relatively conductive with a resistivity of about 2 ohm·m in many applications. Hence, much of the current injected into the surface of the well for ranging signal generation leaks into the formation through the conductive cement, as the injected current travels along the casing.

Figure 2:
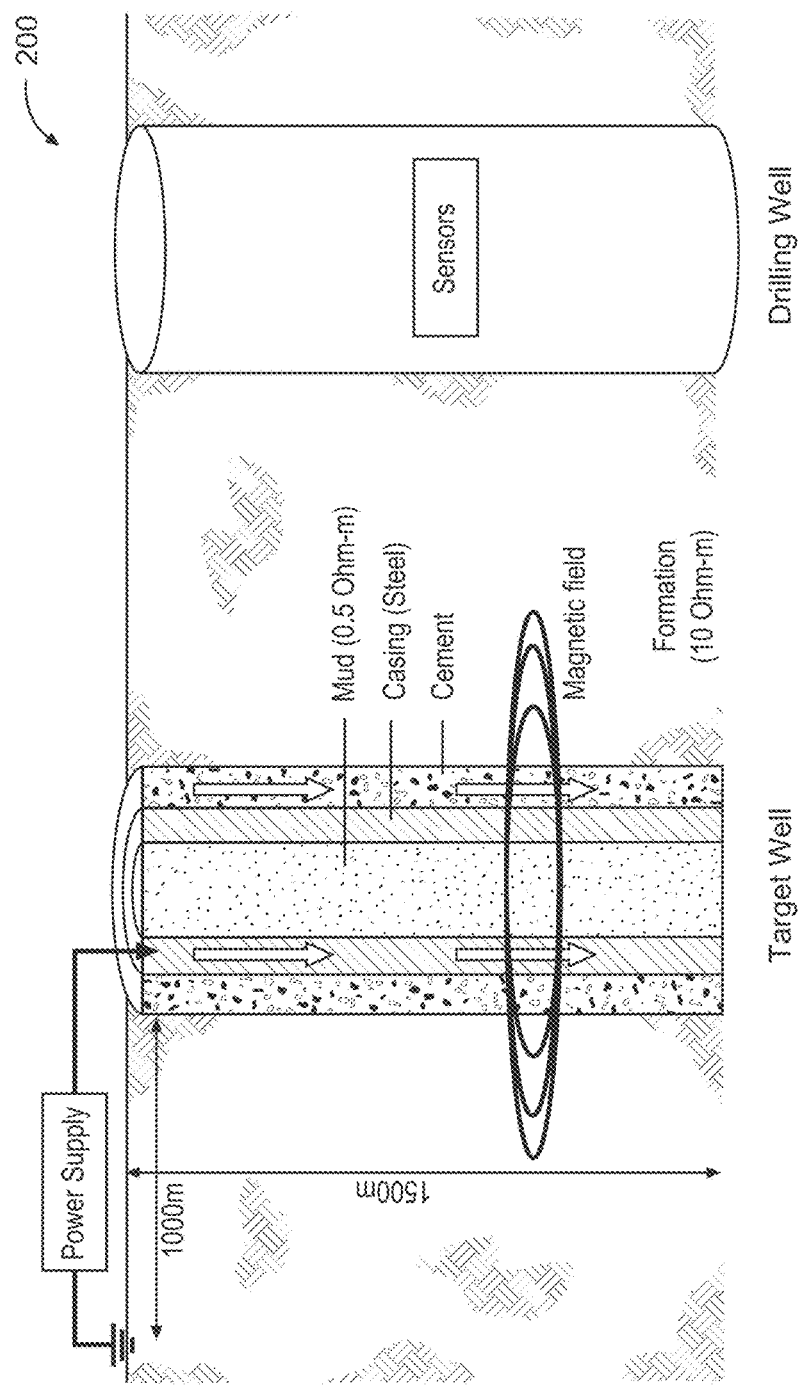
FIG. 2 is a block diagram of a ranging system, for various embodiments.

FIG. 2 is a block diagram of a ranging system 200, for various embodiments. Here the target well structure and magnetic ranging system with surface excitation are shown. Leakage current is reduced in some embodiments using resistive cement. The 1500 m target well structure shown in the figure was modeled and simulated using commercial software available from Computer Simulation Technology AG (CST), with its headquarters in Darmstadt, Germany.

Figure 3A:
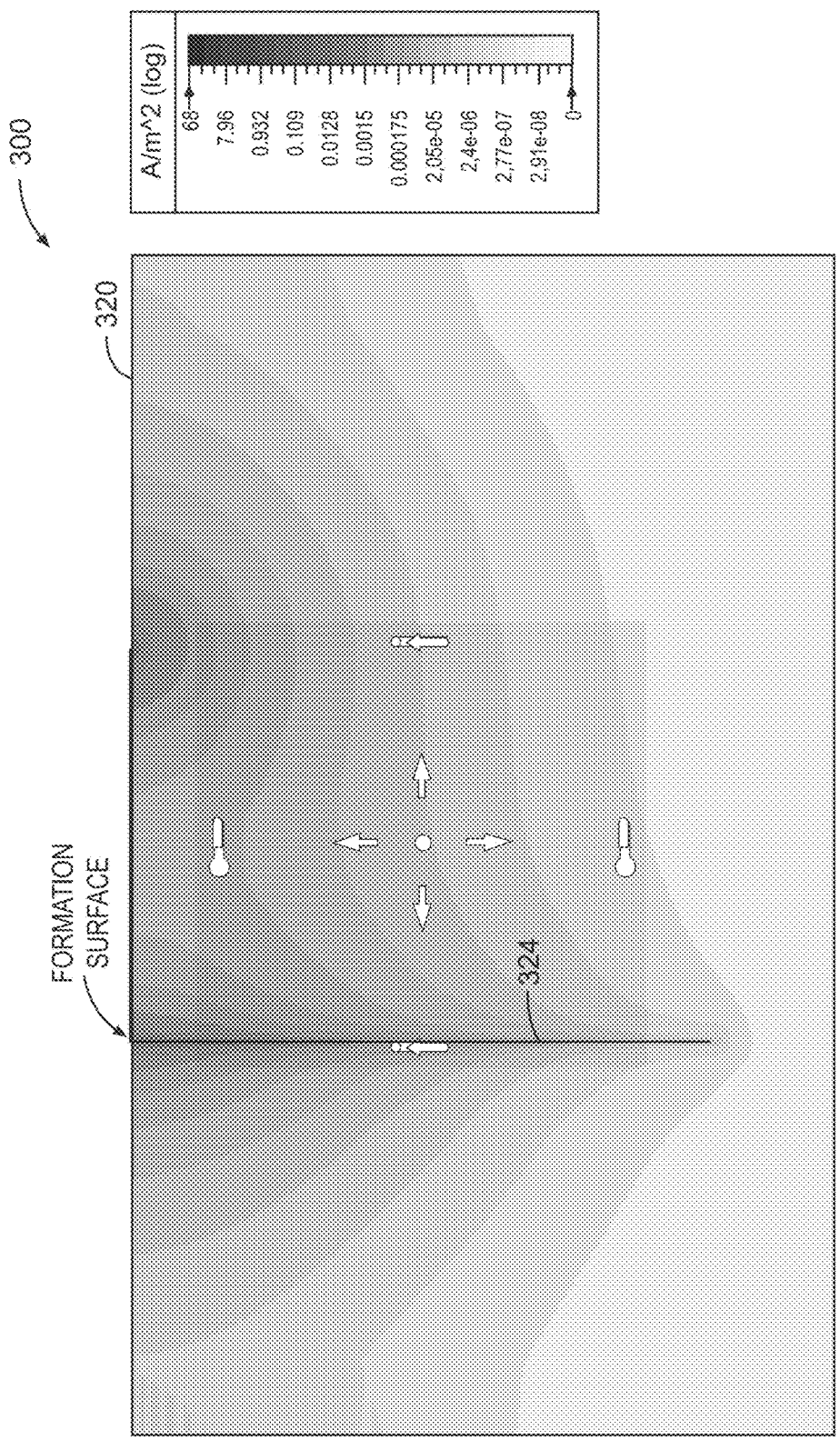
FIGS. 3A and 3B are graphs illustrating current distribution along a target well, under various conditions, for various embodiments.
Figure 3B:
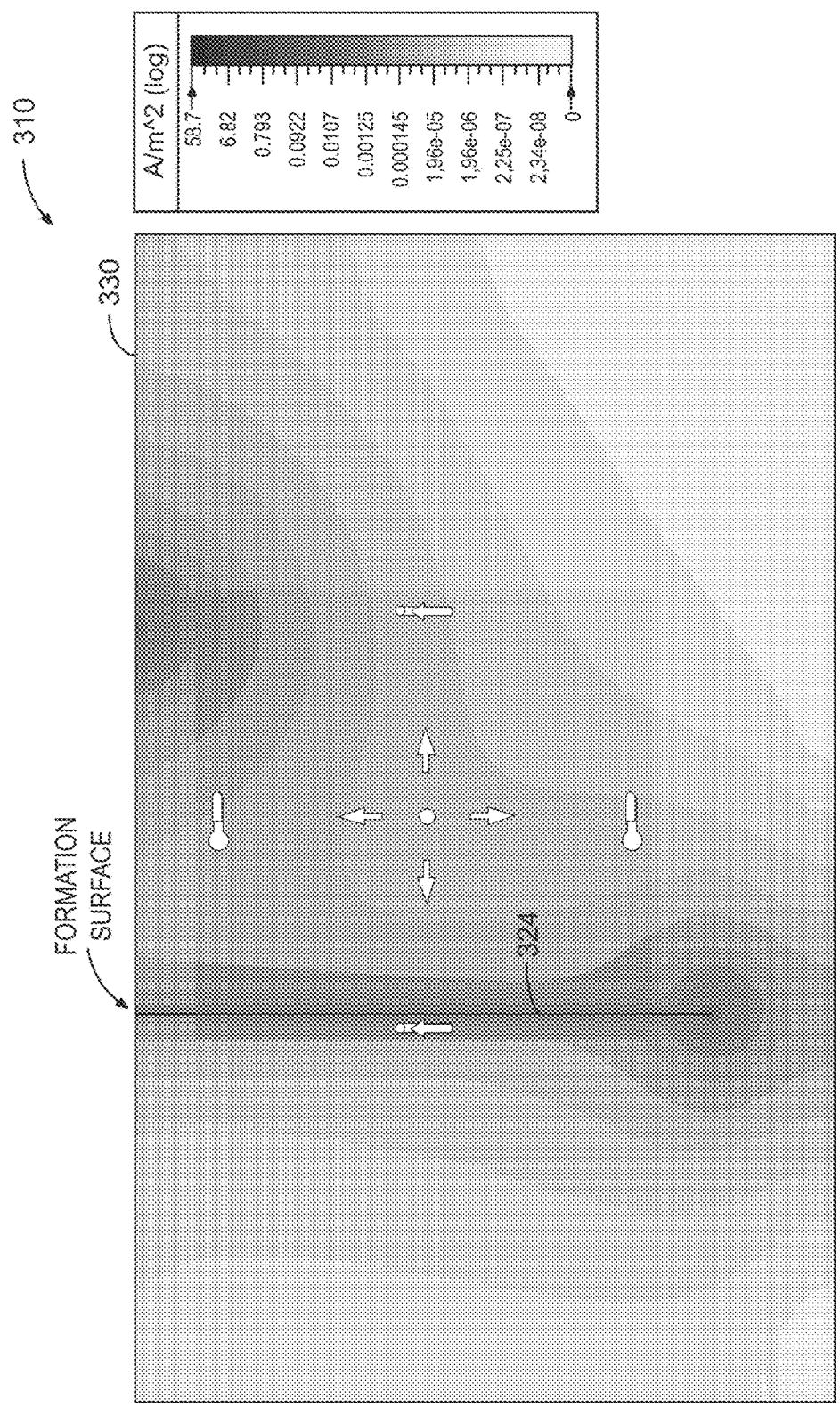

The corresponding two-dimensional (2D) current density distribution is shown in FIGS. 3A and 3B, which are graphs 300, 310 illustrating current distribution along a target well, under various conditions, for various embodiments. The figures each present a 2D graph of leaking current vertically from the well head (formation surface) at the top of the graph, to great depths at the bottom of the graph, horizontally across the formation between wells.

FIG. 3A illustrates the current distribution image 320 for a case with cement resistivity Rc=2 ohm·m (i.e., conductive cement). It can be seen that current attenuates quickly along the length casing 324. That is, much of the current leaks out in the portion of the casing 324 that is near the surface of the formation.

FIG. 3B illustrates the current distribution image 330 for ultra-high resistivity cement, that is, a cement having a resistivity Rc=100000 ohm·m in this case. It can be seen that a much larger portion of the current travels down hole. That is, leakage in the section of casing 324 near the surface of the formation is greatly reduced.

Figure 4:
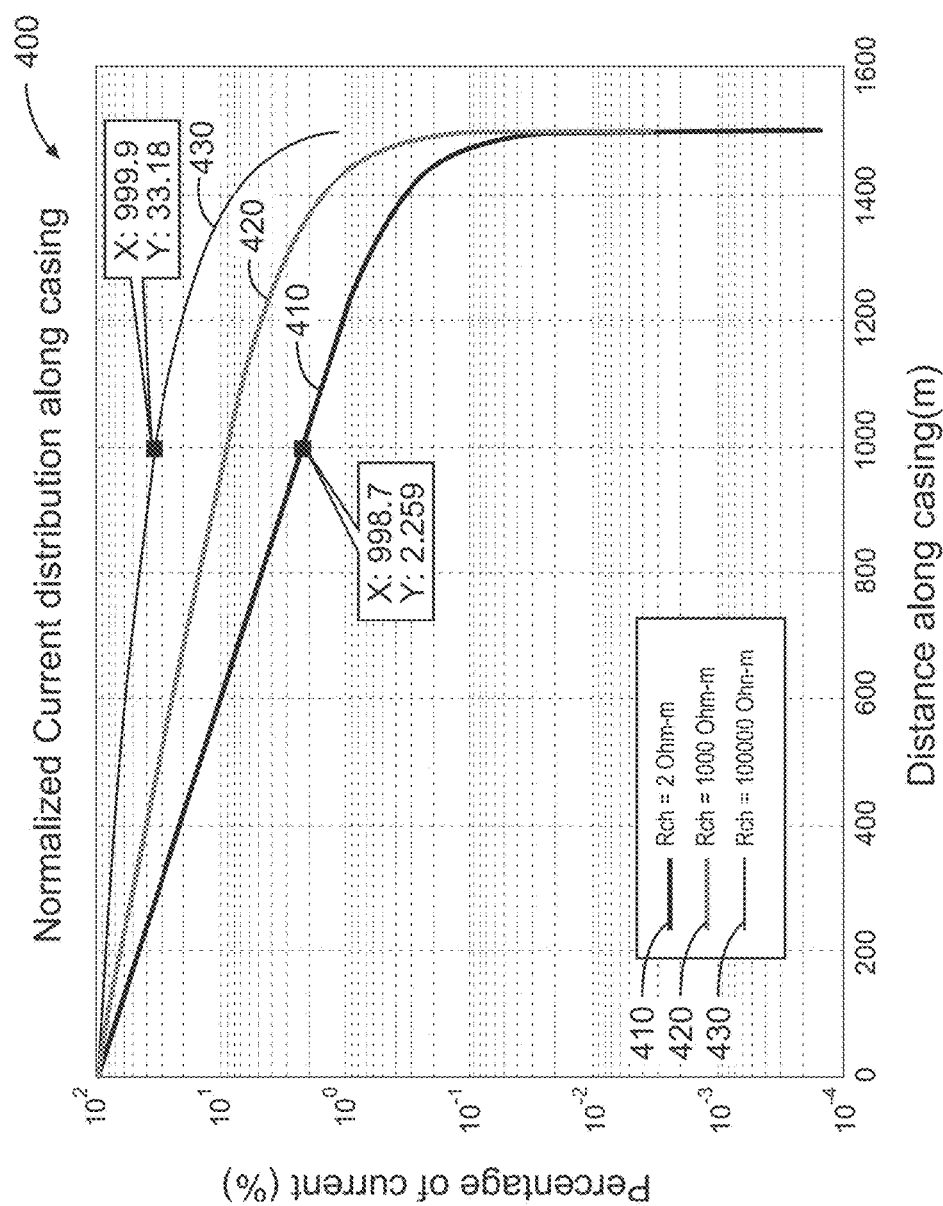
FIG. 4 is a graph illustrating normalized current distribution along a target well, for various embodiments.

FIG. 4 is a graph 400 illustrating normalized current distribution along a target well, for various embodiments. Here the current distribution along the casing is normalized by the current amplitude at the well head. The different curves represent wells employed with different cement resistivity levels.

It can be seen that current drops more slowly along the length of the casing when cement resistivity levels are higher. This is because high resistivity cement acts as an insulator and blocks the path of the leakage current. Thus, in comparison with the 2% casing current remaining at a depth of 1000 m down hole with conductive cement (e.g., cement having a resistivity of 2 ohm·m) 410, 8.5% and 33% of the casing current is left down hole when cement with a resistivity of 1000 ohm·m 420 or 100000 ohm·m 430, is used, respectively. That is, the down hole signal level increases by four times and fifteen times, respectively, with the use of 1000 ohm·m and 100000 ohm·m resistivity cement. Hence, a stronger magnetic field can be generated down hole around the target well casing when such resistive cements are used with the casing of the target well. This provide a greater signal-to-noise ratio (SNR) at the receiver sensors in the drilling well.

It can be difficult to manufacture high resistivity cement, such as cement with a resistivity on the order of 1000 ohm·m or 100000 ohm·m, because cement tends to cure slowly underground, while absorbing water and dissolved salts. Some embodiments include cement that is made more resistive by adding fly ash. Those of ordinary skill in the art will understand other ways to manufacture resistive cement. Thus, another embodiment proposed herein operates to reduce leakage current by surrounding, to at least some degree, the well casing with an insulating material (e.g., a rubber ring or sleeve) for the first 50 or 100 meters from the well surface, or wellhead.

Figure 5:
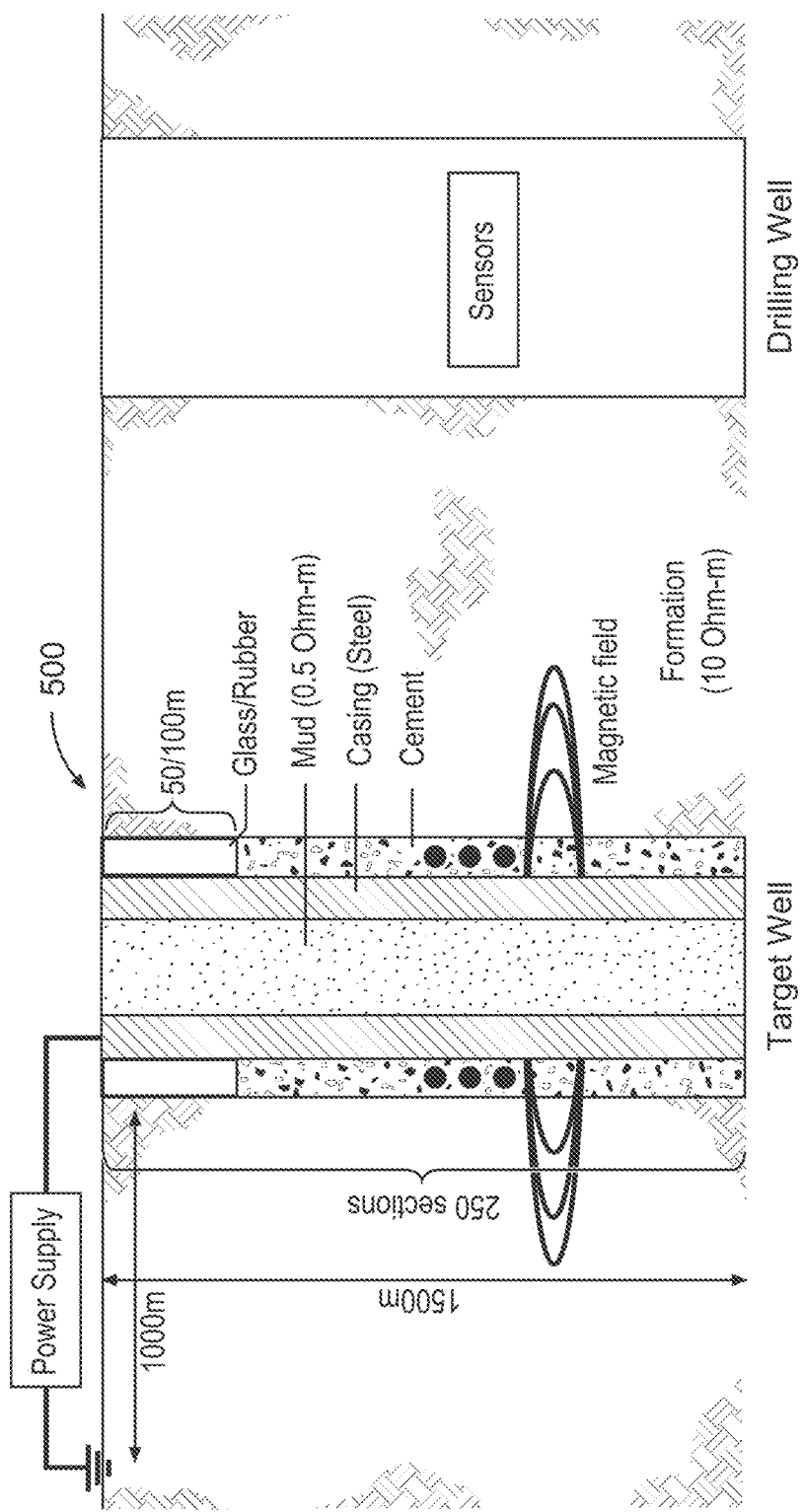
FIG. 5 is a block diagram illustrating an apparatus comprising target well casing with continuous coverage by insulating material, beginning near the surface of the well, for various embodiments.

FIG. 5 is a block diagram illustrating an apparatus 500 comprising target well casing with continuous coverage by insulating material, beginning near the surface of the well, for various embodiments.

As shown in the figure, a length of glass or rubber insulator can be inserted outside of the casing, beginning at a point near the wellhead and extending down hole to some depth, such as 50 m or 100 m. The region near the wellhead is usually where current leakage is greatest. However, when insulating material is used near the surface, current leakage near the wellhead can be greatly reduced, enhancing the amplitude of the current farther down hole. This embodiment may be designated as a well with a "top insulator".

Figure 6A:
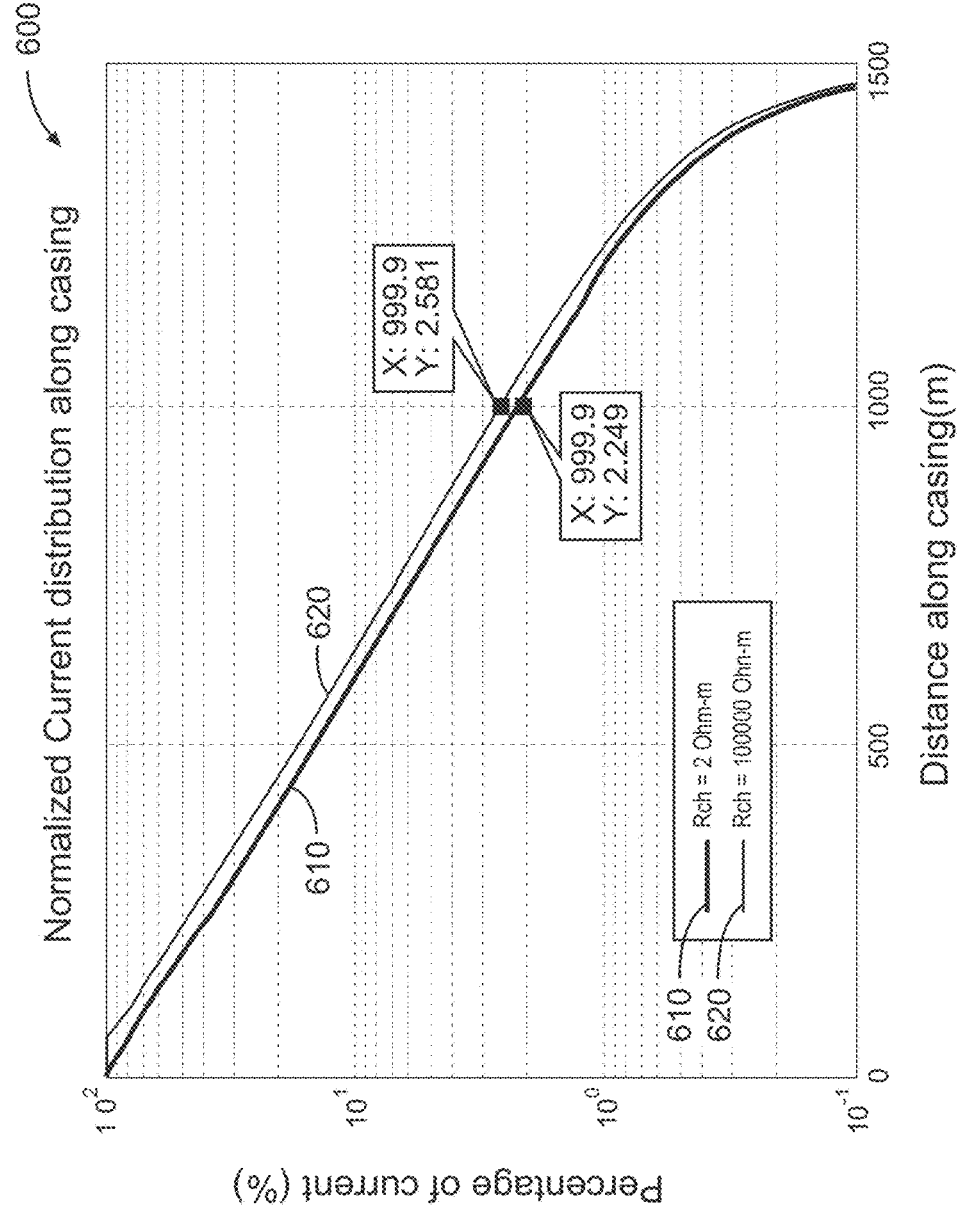
FIGS. 6A and 6B are graphs illustrating current distribution along the casing for the apparatus shown in FIG. 5, for various embodiments.
Figure 6B:
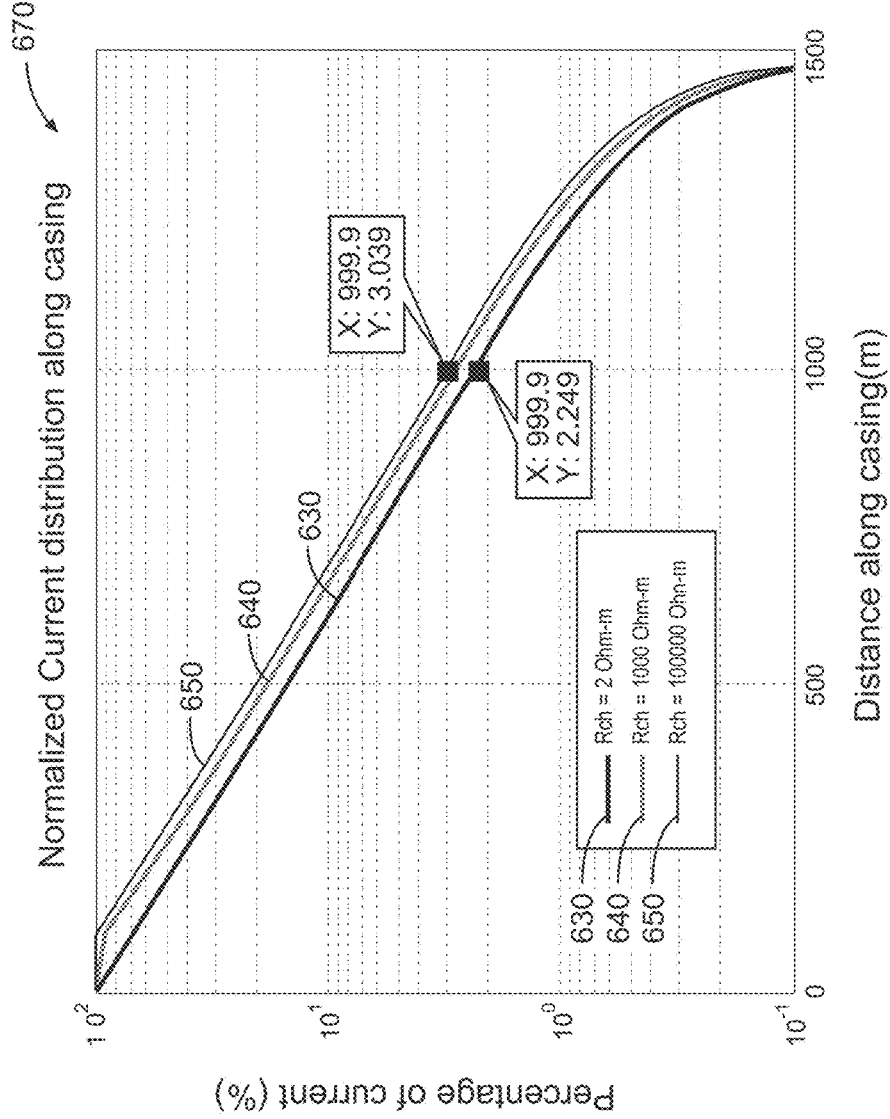

FIGS. 6A and 6B are graphs 600, 670 illustrating current distribution along the casing for the apparatus shown in FIG. 5, for various embodiments. Here, the performance of the structure shown in FIG. 5 was modeled and simulated with 2D finite element modeling (FEM) computer code.

The normalized current distribution along the casing is plotted in FIGS. 6A and 6B, which show results when 50 m and 100 m of insulating material are used to form an insulation section at the top of the wellhead, respectively. The curves in each figure show the result when a rubber tube is used as insulating material (620, 640, 650), and when no insulating material is used (610 and 630), respectively. It is clear that using the insulating material helps to block current leakage in the region near the wellhead. However, current continues to drop once the insulating material ends. Thus, at 1000 m down hole, 2.58% and 3.04% of the original current remains when the rubber is used as insulating material (620, 640, 650), compared with 2.25% of the original current remaining when no insulating material is used (610, 630). That is, a 35% current increase is achieved with the use of insulating material in this case.

Because it may be expensive to put a 50 m or 100 m length of insulating material practice, or perhaps difficult to install such a long tube with segmented casing (e.g., casing may comprise segments of pipe, measuring 5 m or 10 m long per segment), another embodiment to reduce leakage current is proposed. In this case, relatively short sections of insulating material (e.g., one, four, or nine meter rubber or glass tubes forming a non-continuous insulating material) are installed outside of the casing before the casing is placed downhole, and cement is put in place.

Figure 7:
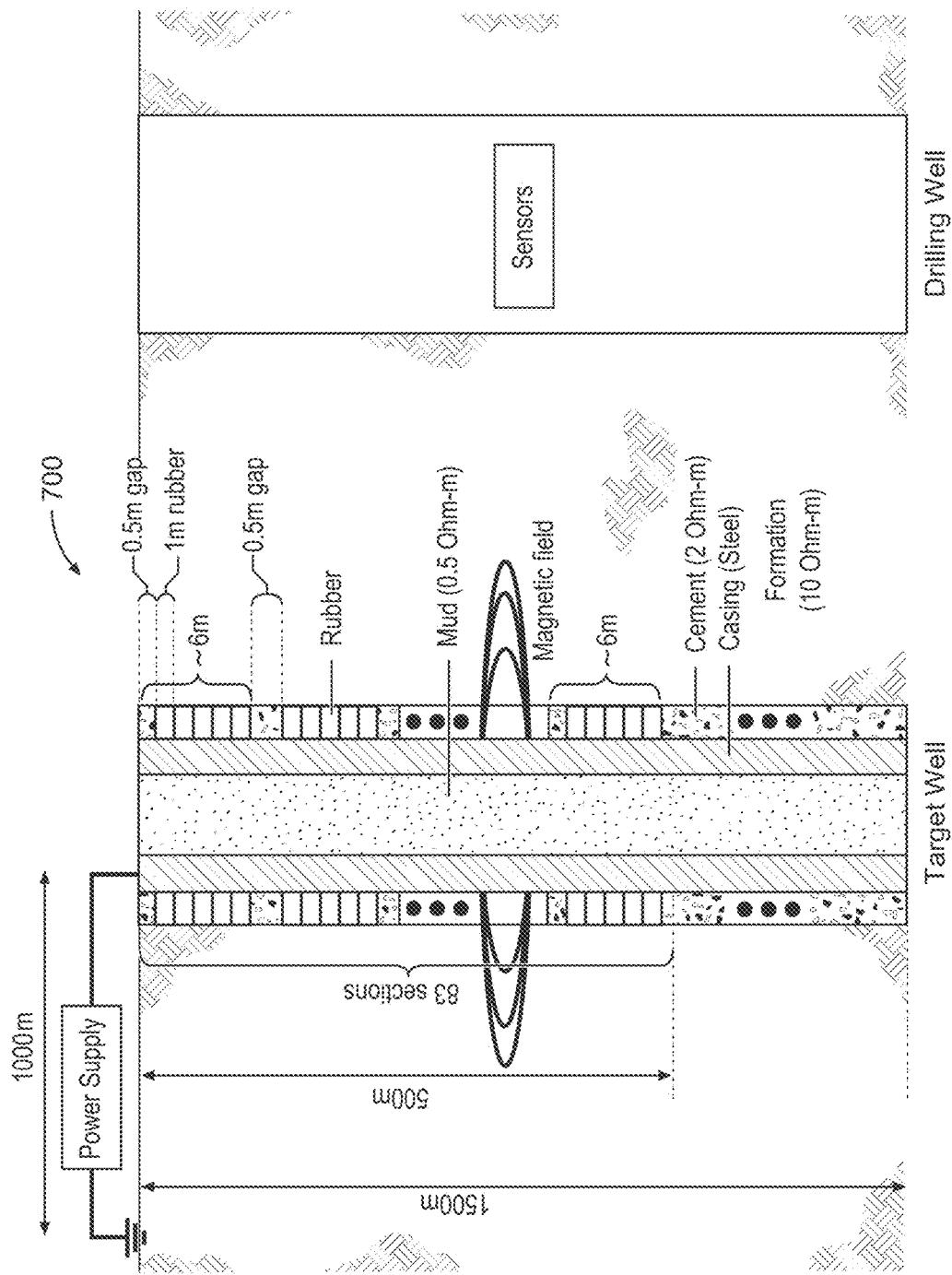
FIG. 7 is a block diagram illustrating an apparatus comprising target well casing with discontinuous coverage by insulating material, for various embodiments.

Thus, FIG. 7 is a block diagram illustrating an apparatus 700 comprising target well casing with discontinuous coverage by insulating material, for various embodiments. As shown in the figure, for each casing segment (e.g., 6 meters long), five one meter long rubber rings or tubes are installed as a wrapper outside of the casing. Gaps of about one-half meter are kept at each end of the casing wrapper to enhance connectivity between conductive casing segments.

Over a length of 500 m, eighty-three sets of casing segments are installed with rubber rings wrapping each segment, beginning near the surface, at the wellhead. Although there are still some current leaking from each of the joints between casing segments, the leakage current is greatly reduced by the presence of the insulating material, in the form of rubber rings, or tubes.

Figure 8:
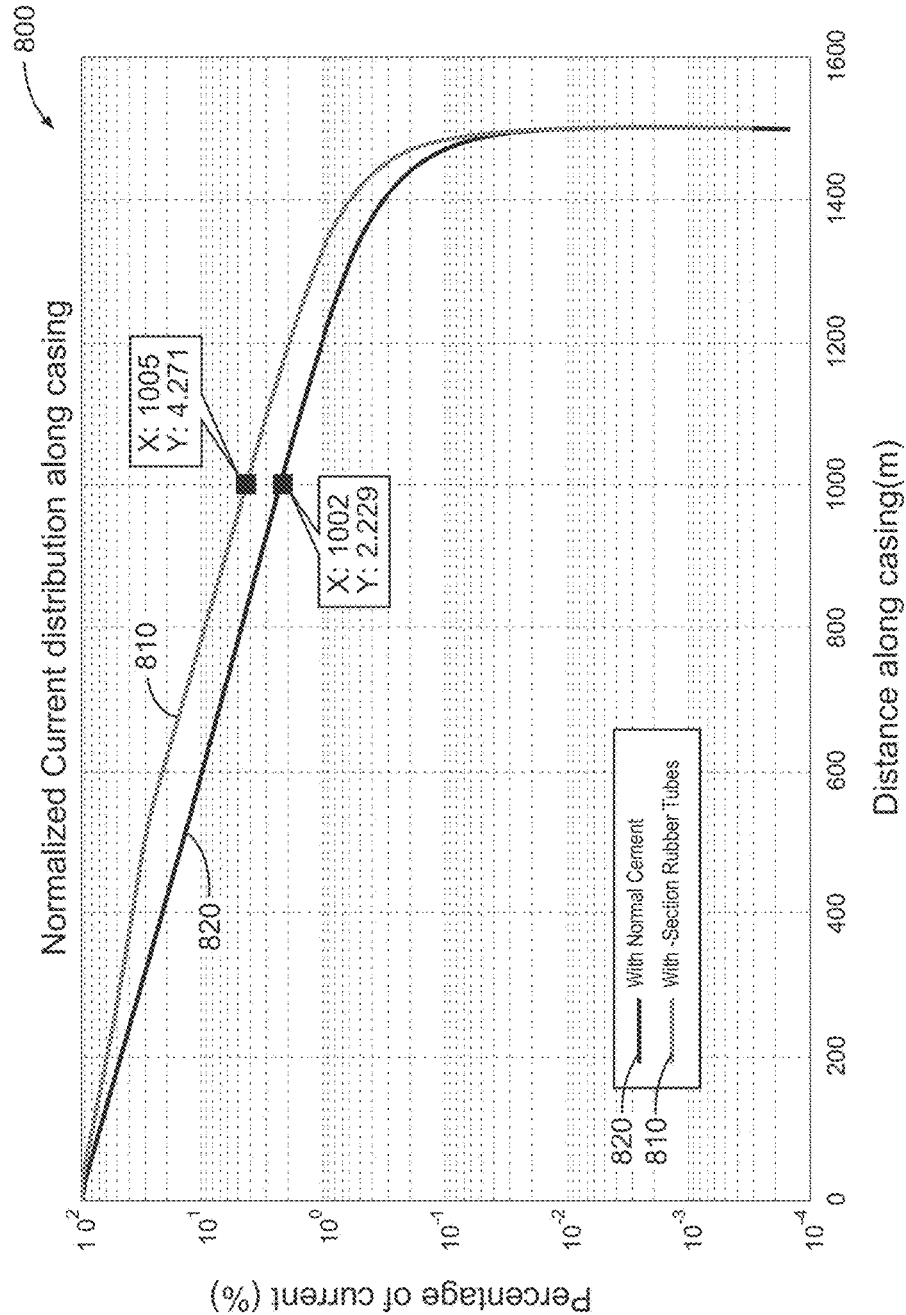
FIG. 8 is a graph illustrating current distribution along the casing for FIG. 7, for various embodiments.

FIG. 8 is a graph 800 illustrating current distribution along the casing for FIG. 7, for various embodiments. The target well structure with rubber tube sections was modeled and simulated using 2D FEM computer code. The normalized current distribution along the casing was plotted in the figure, with the curves illustrating current leakage results with insulating material 810 (e.g., rubber tubes or rings) and without insulating material 820. It can be seen that the current drop-off is reduced for the first 500 meters, when insulating material is used. That is, the injected current is conserved because the insulating material helps block current leakage in each wrapped section of casing.

The leakage current continues to make its appearance after the end of the insulated casing material. For example, at 1000 m down hole, there is 4.27% of the injected current remaining when insulating material is used, compared to only 2.23% of the injected current remaining when no insulating material is used. That is, a 91% increase in current is realized. Thus, because this embodiment easier to implement in the field (than continuous insulation), a greater magnitude of down hole current can be retained.

Surface excitation current that leaks from the target well may also propagate into conductive structures of the drilling well, where the ranging sensors are located. It has been found that such leakage current exists and also affects the accuracy of ranging distance determination, especially at greater depths where the casing current in the target well drops significantly. As a consequence, the proposed apparatus, methods, and systems used to isolate lengths of the target well (e.g., using resistive cement, and/or insulating material) can be also implemented as part of the drilling well to reduce the effect of leakage current on sensor measurements due to conduction by the drilling well structure.

Figure 9:
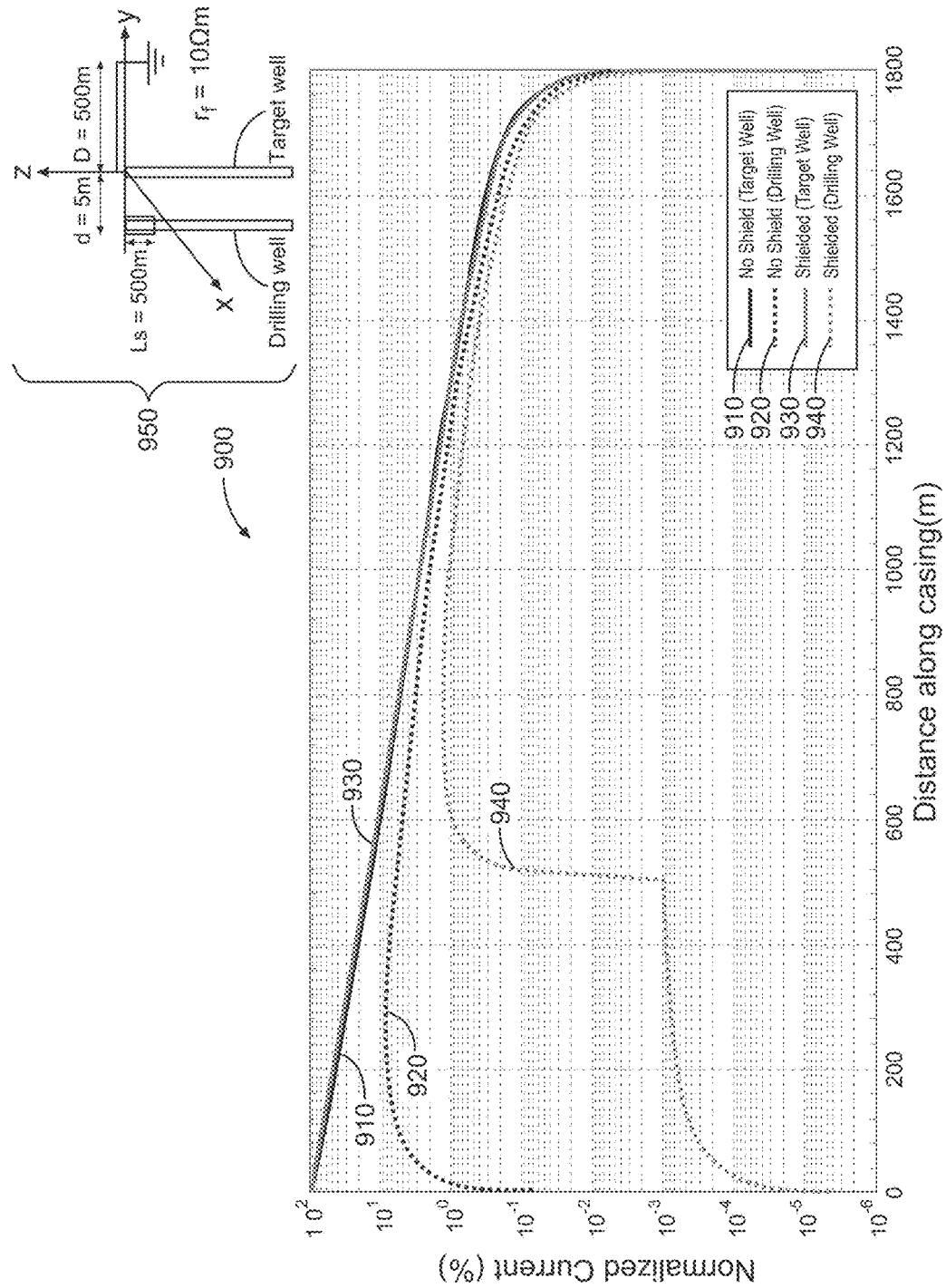
FIG. 9 is a graph of normalized current distribution of a target well without insulating material, and a drilling well with, and without insulating material, according to various embodiments.

FIG. 9 is a graph 900 of normalized current distribution of a target well without insulating material, and a drilling well with, and without insulating material, according to various embodiments. The figure presents both cased-hole conditions for a target well and a drilling well configuration 950, as they might appear in a common drilling scenario. The shielding insulation, when applied, extends for a distance of 500 m, and the wells are separated by 5 m.

As shown in the normalized current distribution of the graph 900 in the figure, the leakage current in the drilling well is close to the casing current in the target well at greater depths (e.g., after the depth exceeds 1000 m). The closer the magnitude of the target well current and the magnitude of the leakage current in the drilling well become, the more the leakage current interferes with sensor measurements in the drilling well. Therefore, this effect can have a significant influence on ranging accuracy and performance at greater depths, and ranging calculations may lead to misinterpreting the relative well positions at these depths. To render sensor measurements that are less sensitive to leakage current effects, the apparatus, methods, and systems proposed herein can be also utilized in the drilling well.

As shown in FIG. 9, the leakage current in the drilling well with shielded insulation is much less than the case without insulation. Consequently, it can be seen that the application of insulating material in a target well helps preserve current traveling along the casing, whereas the application of such insulation in a drilling well helps reduce the effect on the measurement current signal in the drilling well due to leakage current from the target well.

Figure 10:
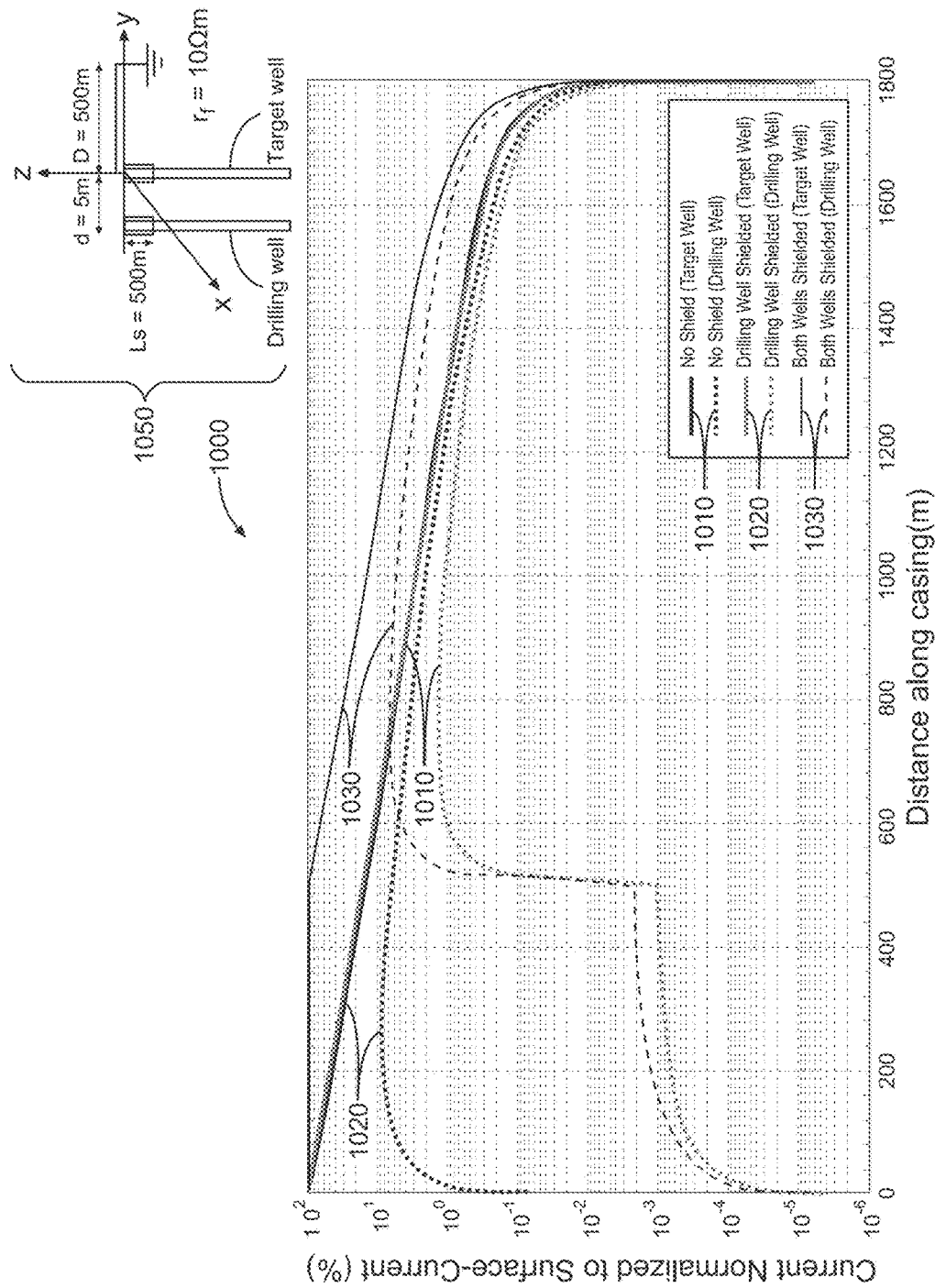
FIG. 10 is a graph of normalized current distribution of target and drilling wells with, and without insulating material, according to various embodiments.

FIG. 10 is a graph 1000 of normalized current distribution of target and drilling wells with, and without insulating material, according to various embodiments. The figure shows the modeled responses of three cases involving a target well and a drilling well configuration 1050, as they might appear in a common drilling scenario. The first case appears without any insulation applied in both target and drilling wells 1010. The second case appears with only the drilling well having insulating material 1020, and the last case appears with insulating material applied to both the target and drilling wells 1030. Again, the shielding insulation, when applied, extends for a distance of 500 m, and the wells are separated by 5 m. The results reveal that shielding both wells with insulating material improves the signal down hole in the target well, with reduced measurement interference in the drilling well.

As noted previously, when surface excitation is used as part of a well range determination system, current leakage can result in wasting much of the power delivered into the well casing. The novel apparatus, methods, and systems disclosed herein save power and provide greater signal amplitudes at every depth down hole, when compared to conventional ranging operations, improving ranging measurement technology. This is accomplished without the use of extra cabling, transmitters, receivers, or increasing the power used at the surface. In addition, the proposed methods also reduce interference with sensor measurements due to leakage current flowing to a drilling well where the sensors are located.

Improved down hole current strength results in a greater ranging detection range, especially at greater depths. EM telemetry applications may benefit in a similar fashion. That is, the apparatus, methods, and systems disclosed herein can reduce the transmission signal loss and enhance the SNR at the telemetry receiver. A non-limiting summary of various embodiments will now be given.

FIG. 11 is a flow diagram of methods 1100, according to various embodiments. In some embodiments, a reduced conduction well (that operates to block leakage current) can be fabricated using "resistive cement", which is cement having a resistivity of at least 10 ohm·m. Resistive cement can be divided into three classes: medium resistivity cement, high-resistivity cement, and ultra-high resistivity cement. "Medium resistivity cement" has a resistivity of greater than 10 ohm·m. "High resistivity cement" has a resistivity of greater than 50 ohm·m. An "ultra-high resistivity cement" is one that has a resistivity of at least 100 ohm·m. Thus, referring to FIG. 11, it can be seen that a method 1100 may comprise cementing a target well with a target well cement comprising resistive cement at block 1105; injecting an electromagnetic signal into a conductive casing material at least partially surrounded by the target well cement at block 1120; and receiving the electromagnetic signal at a signal receiver disposed within the target well, or within a drilling well separated from the target well at block 1125.

The injected signal may be processed as a ranging signal. Thus, the method 1100 may comprise processing the electromagnetic signal as a ranging signal at block 1130 to determine a distance or direction to the target well, from the drilling well.

The injected signal may be processed as a telemetry signal. The, the method 1100 may also comprise processing the electromagnetic signal as a telemetry signal to determine information contained in the telemetry signal at block 1130.

The drilling well may be cased so as to reduce the influence of leakage currents on signal reception. Thus, the method 1100 may comprise casing a portion of the drilling well with one or more lengths of insulated drilling well casing material at block 1110.

The drilling well may be cemented to reduce the influence of leakage currents on signal reception. Thus, the method 1100 may comprise cementing the drilling well with a drilling well cement comprising resistive cement at block 1115.

FIG. 12 is a flow diagram of additional methods 1200, according to various embodiments. In some embodiments, a reduced conduction well can be fabricated using insulated casing, which comprises conductive casing surrounded, or at least partially surrounded (in at least the vertical or horizontal direction), by insulating material, such as rubber or glass. "Insulating material" is any material, including a polymer, that has a resistivity of at least 10 ohm·m. Insulating material can be divided into three classes: medium resistivity insulating material, high-resistivity insulating material, and ultra-high resistivity insulating material. "Medium resistivity insulating material" has a resistivity of greater than 10 ohm·m. "High resistivity insulating material" has a resistivity of greater than 50 ohm·m. An "ultra-high resistivity insulating material" is one that has a resistivity of at least 100 ohm·m.]

Thus, a method 1200 may comprise casing a target well with insulating material at block 1205; cementing the target well on an outer surface of the insulating material at block 1210; injecting a current into the target well at block 1225; and receiving a corresponding signal at a signal receiver disposed within a drilling well at block 1230.

The target well can be cased using a continuous length of insulation. Thus, the method 1200 may comprise the activity of casing the well at block 1215, which further comprises: casing the target well with a single continuous length of the insulating material, wherein the insulating material is applied to at least a portion of conductive well casing material, beginning at a location proximate to a surface of the target well.

The target well can be cased using discontinuous lengths of insulation. Thus, the method 1200 may comprise the activity of casing the well at block 1215, which further comprises casing the target well with a multiple lengths of the insulating material, wherein the multiple lengths are separated by gaps of uninsulated portions of casing material.

The injected signal can be processed in different ways, depending on the type of information that is to be extracted from it. Thus, the method 1200 may comprise processing the corresponding signal received at the signal receiver at block 1235, either as a ranging signal to determine a distance or direction to the target well, from the drilling well, or as a telemetry signal to determine information contained in the telemetry signal.

The drilling well may be cased so as to reduce the influence of leakage currents on signal reception. Thus, the method 1200 may comprise casing a portion of the drilling well with one or more lengths of insulating material at block 1215.

The drilling well may be cemented to reduce the influence of leakage currents on signal reception. Thus, the method 1200 may comprise cementing the drilling well with a drilling well cement comprising resistive cement at block 1220.

Figure 13:
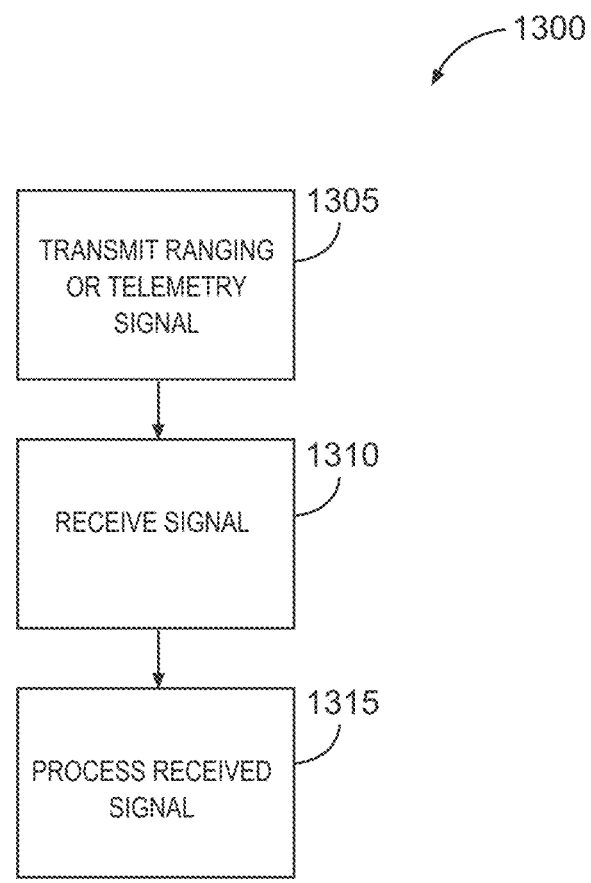
FIG. 13 is a flow diagram of yet more methods, according to various embodiments.

FIG. 13 is a flow diagram of yet more methods 1300, according to various embodiments. In some embodiments, a method 1300 comprises transmitting an electromagnetic signal from one borehole to another, where at least one of the boreholes is constructed using insulated casing and/or high resistivity cement. Thus, one method 1300 includes, at block 1305, transmitting an electromagnetic signal comprising a ranging signal or telemetry signal from a first borehole to a second borehole via a geological formation, wherein the first borehole is cemented with a resistive cement, or is cased with an insulated material; and, at block 1310, receiving the electromagnetic signal at the second borehole with a signal receiver.

The second borehole may also be constructed to reduce the effects of leakage current on measurement signals. Thus, the activity of receiving at block 1310 may comprise receiving the electromagnetic signal at the second borehole, wherein the second borehole is cemented with a second cement comprising resistive cement, or is cased with a second insulating material.

The injected signal can be processed in different ways, depending on the type of information that is to be extracted from it. Thus, the method 1300 may comprise processing the electromagnetic signal at block 1315 as either a ranging signal to determine a distance or direction from the second borehole to the first borehole, or as a telemetry signal to determine information contained in the telemetry signal.

In any of the methods described herein, in some embodiments, the drilling well and the target well may be the same well. That is, the signal injected into the well casing of the well may be received at a receiver disposed in the same well. This set of embodiments may be useful when the injected signal is a telemetry signal. Moreover, it is noted that in any of the methods described herein, the injected signal may comprise one or more of a static electric signal, a magnetic signal, a telemetry signal, or an electromagnetic signal.

Figure 14:
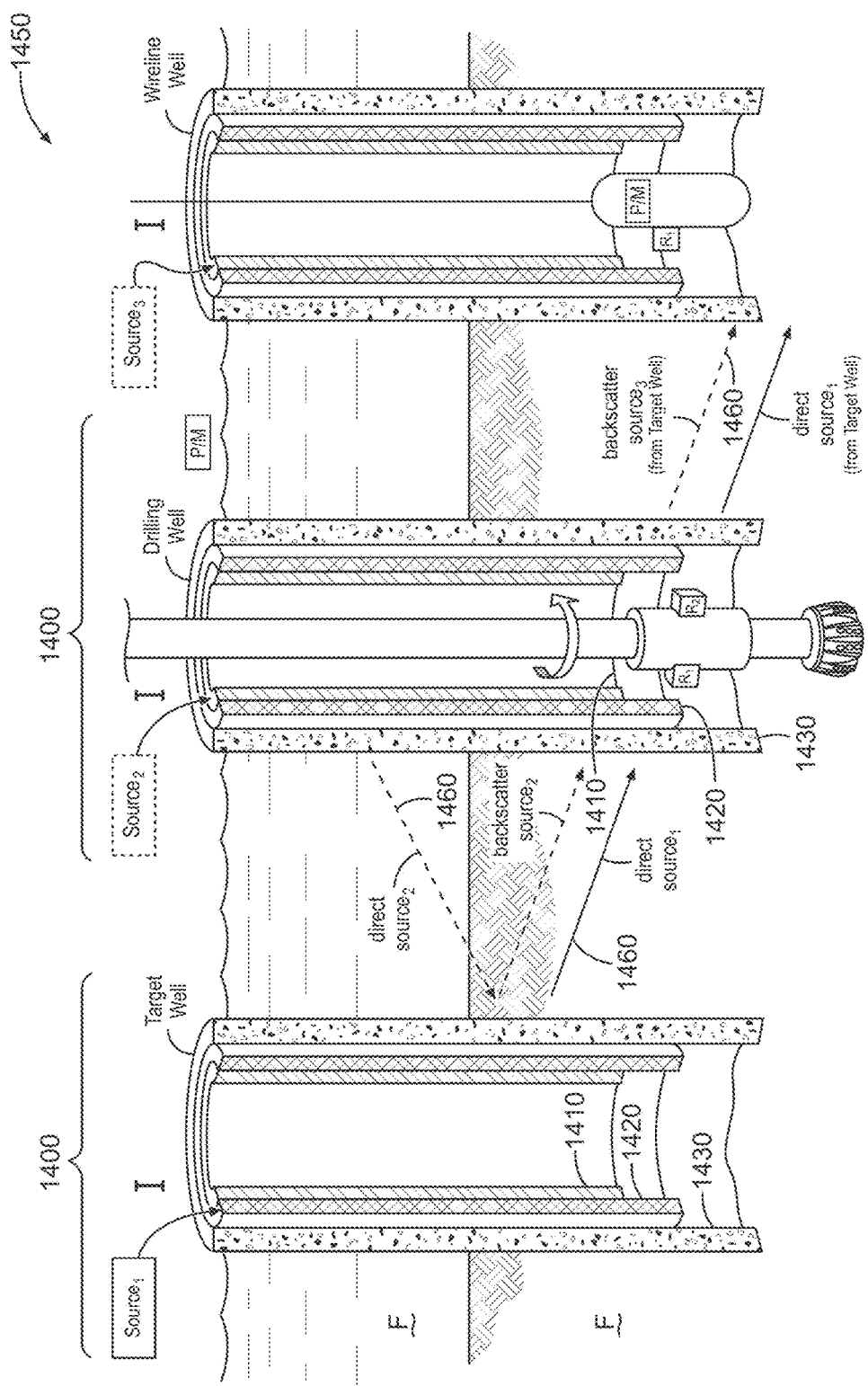
FIG. 14 is a block diagram of apparatus and systems, according to various embodiments.

FIG. 14 is a block diagram of apparatus 1400 and systems 1450, according to various embodiments. In some embodiments, an apparatus 1400 may comprise a well constructed with an insulated casing. Thus, the apparatus 1400 may comprise a target well having a casing material 1410 at least partially surrounded by an insulating material 1420 and cement 1430. The insulating material 1420 may comprise rubber or glass, or a polymer.

The casing may include conductive material surrounded to some degree by insulating material 1420. Thus, the casing material 1410 may comprise a conductive metal at least partially surrounded by the insulating material 1420, to reduce current leakage into a geological formation (which may comprise the Earth, and/or water) when the current I is injected into the casing material 1420.

The apparatus 1400 may further comprise a signal injection apparatus. Thus, the apparatus 1400 may comprise a current source Source1.

An apparatus 1400 may comprise a well constructed with a high resistivity cement. Thus, the apparatus 1400 may comprise a target well having a conductive casing material 1410 cemented with a target well cement 1430 comprising resistive cement.

A system 1450 might include an excitation source Source1, Source2, Source3, and an electromagnetic signal receiver R1, R2, R3. Thus, a system 1450 may comprise an excitation source Source1, Source2, Source3, associated with a target well or a drilling well to transmit an electromagnetic ranging signal 1460 into a surrounding formation F; and an electromagnetic signal receiver R1, R2, R3 located in the drilling well, to rotate and to receive the electromagnetic ranging signal 1460, directly or via backscatter.

A system 1450 may comprise a target well and a drilling well, where at least a portion of the target well is insulated from the formation F. Thus, the system 1450 may comprise a target well having a casing material 1410 at least partially surrounded by insulating material 1420 and cement 1430; a drilling well including a signal receiver R1, R2; and a signal injection apparatus Source1, Source2, to inject a signal I into the casing material 1410, wherein the signal is to be received by the signal receiver R1, R2, as at least one of a ranging signal or a telemetry signal.

The signal receiver may comprise a variety of receiver types. Thus, the signal receiver may comprise a magnetometer, a coil antenna, or a telemetry receiver.

The drilling well casing material 1410 may also be insulated from the formation F. Thus, the drilling well may further comprise a drilling well casing material 1410 that is insulated with an insulating material 1420.

In some embodiments, the embodiments described herein may be realized in part, as a set of instructions on a computer readable medium M comprising ROM, RAM, CD, DVD, hard drive, flash memory device, or any other computer readable medium, now known or unknown, that when executed causes a computing system, such as computer as illustrated in FIG. 1 or some other form of a data processing device P, to implement portions of a method of the present disclosure, for example the methods described in FIGS. 11, 12, and 13 (e.g., for computer-assisted well completion).

Though described serially in the examples of FIGS. 11, 12, and 13, one of ordinary skill in the art would recognize that other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

It is expected that the system range and performance can be extended with the various embodiments described herein. Power can often be saved, and accuracy of ranging measurements improved. Signal components may be extracted and converted to pixel colors or intensities and displayed as a function of tool position and azimuth. Assuming the target casing string is within detection range, it may appear as a bright (or, if preferred, a dark) band in the image. The color or brightness of the band may indicate the distance to the casing string, and the position of the band indicates the direction to the casing string. Thus, by viewing such an image, a driller can determine in a very intuitive manner whether the new borehole is drifting from the desired course and he or she can quickly initiate corrective action. For example, if the band becomes dimmer, the driller can steer towards the casing string. Conversely, if the band increases in brightness, the driller can steer away from the casing string. If the band deviates from its desired position directly above or below the casing string, the driller can steer laterally to re-establish the desired directional relationship between the boreholes.

Numerous other variations and modifications will become apparent to those skilled in the art once the above disclosure is fully appreciated. For example, the foregoing discussion has focused on a logging while drilling implementation, but the disclosed techniques would also be suitable for wireline tool implementation (as shown in FIG. 13). It is intended that the following claims be interpreted to embrace all such variations and modifications.

This detailed description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those of ordinary skill in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of the knowledge provided by this disclosure. Thus, the present disclosure includes a variety of combinations and/or integrations of the embodiments and examples described herein, as well as further embodiments and examples, as defined within the scope of all claims based on this disclosure, as well as all legal equivalents of such claims.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

What is claimed is:

1. A method, comprising:
    cementing a target well with a target well cement comprising resistive cement having resistivity that is greater than a resistivity of a subsurface formation through which the target well passes;
    injecting an injected signal into a conductive casing material at least partially surrounded by the target well cement; and
    receiving a resulting signal that results from the injecting at a signal receiver disposed within at least one of the target well and a drilling well separated from the target well.

2. The method of claim 1, wherein the resistive cement has a resistivity of at least 10 ohms per meter.

3. The method of claim 1, wherein the injected signal comprises at least one of a static electric signal, a magnetic signal, and an electromagnetic signal.

4. The method of claim 1, further comprising:
    processing the resulting signal as a ranging signal to determine at least one of a distance and a direction to the target well from the drilling well.

5. A method, comprising:
    casing a target well with a conductive casing; and
    selectively positioning insulating material around the conductive casing, wherein the selectively positioning of the insulating material is such that gaps are created that are without the insulating material along the target well, wherein the insulating material has resistivity that is greater than a resistivity of a subsurface formation through which the target well passes.

6. The method of claim 5,
    wherein the conductive casing comprises multiple casing segments,
    wherein selectively positioning the insulating material comprises, for at least one casing segment of the multiple casing segments, positioning the insulating material around the at least one casing segment such that a gap is created at each end of the at least one casing segment.

7. The method of claim 5, wherein selectively positioning the insulating material comprises positioning the insulating material around the conductive casing at a wellhead of the target well.

8. The method of claim 5, wherein the insulating material comprises at least one of rubber and glass.

9. The method of claim 5, further comprising:
    selectively positioning a target well cement between the conductive casing and a wall of the target well, wherein the selectively positioning of the target well cement is such that gaps are created that are without the target well cement between positions along the target well having the target well cement, wherein the selectively positioning of the target well cement comprises the target well cement being at positions that do not include the insulating material.

10. The method of claim 9, wherein the target well cement comprises a resistive cement having a resistivity of at least 10 ohms per meter.

11. An apparatus, comprising:
    a conductive casing to case a target well;
    target well cement positioned between the conductive casing and a wall of the target well, wherein the target well cement comprises resistive cement having resistivity that is greater than a resistivity of a subsurface formation through which the target well passes; and
    insulating material selectively positioned around the conductive casing such that gaps are created that are without the insulating material along the target well.

12. The apparatus of claim 11, wherein the resistive cement has a resistivity of at least 10 ohms per meter.

13. The apparatus of claim 11,
    wherein the conductive casing comprises multiple casing segments,
    wherein, for at least one casing segment of the multiple casing segments, the insulating material is selectively positioned around the at least one casing segment such that a gap is created at each end of the at least one casing segment.

14. An apparatus, comprising:
    a conductive casing to case a target well; and insulating material selectively positioned around the conductive casing, such that gaps are created that are without the insulating material along the target well, wherein the insulating material has resistivity that is greater than a resistivity of a subsurface formation through which the target well passes.

15. The apparatus of claim 14,
wherein the conductive casing comprises multiple casing segments,
wherein, for at least one casing segment of the multiple casing segments, the insulating material is selectively positioned around the at least one casing segment such that a gap is created at each end of the at least one casing segment.

16. The apparatus of claim 14, wherein the insulating material is at least positioned around the conductive casing at a wellhead of the target well.

17. The apparatus of claim 14, wherein the insulating material comprises at least one of rubber and glass.

18. The apparatus of claim 14, further comprising:
a target well cement selectively positioned between the conductive casing and a wall of the target well, wherein the selectively positioning of the target well cement is such that gaps are created that are without the target well cement between positions along the target well having the target well cement, wherein the selectively positioning of the target well cement comprises the target well cement being at positions that do not include the insulating material.

19. The apparatus of claim 18, wherein the target well cement comprises the resistive cement having a resistivity of at least 10 ohms per meter.

\* \* \* \* \*